June 2, 1970     A. L. MOORE ETAL     3,515,941
ELECTRICAL LEAKAGE DETECTOR
Filed Oct. 24, 1967

INVENTORS
ASTON L. MOORE
CHARLES R. MOORE
BY
Woodhams, Blanchard & Flynn
ATTORNEYS

United States Patent Office 3,515,941
Patented June 2, 1970

3,515,941
ELECTRICAL LEAKAGE DETECTOR
Aston L. Moore, 220 Hammond Place, South Bend, Ind. 46601, and Charles R. Moore, 1615 N. Merrifield, Mishawaka, Ind. 46544
Filed Oct. 24, 1967, Ser. No. 677,580
Int. Cl. H02l 7/26
U.S. Cl. 317—18         9 Claims

ABSTRACT OF THE DISCLOSURE

An automatic protective circuit for de-energizing an electric power circuit upon the appearance of a leakage therefrom to a return path, said power circuit including a transformer, the secondary winding of said transformer having two output terminals, wherein the power relay has contacts in series with the power circuit for de-energizing the power circuit when the winding of the power relay is energized. Furthermore, a sensing relay has contacts in series with the power relay winding so that it can be energized in response to energization of the sensing relay winding. A conductor is provided connecting one end of the sensing relay winding to a pair of rectifiers which are connected, respectively, to the output terminals of the secondary transformer winding. A further pair of rectifiers is connected to the other end of the sensing relay winding and whose other ends are connected, respectively, to the output terminals of the secondary winding of the transformer. A third rectifier connects at least one of the ends of the sensing relay to ground so that an incomplete path is provided from at least one side of the power circuit through the sensing relay and including the return path so that leakage from one side of the power circuit to the return path will complete the incomplete path, thus energize the sensing relay for deenergizing the power circuit.

Field of the invention

This invention is a modification of the circuit shown in our Pat. No. 3,168,682, issued Feb. 2, 1965, and relates to a supervisory system and, more particularly, relates to a type thereof applicable to domestic, mobile home, hospital, or other, uses for turning off the electric power supply upon the appearance of a short circuit between a load circuit associated with said electric power supply and a ground return path, such as a water pipe, other electrical instruments or the frame of a mobile home.

Description of the prior art

While the circuit giving rise to the present invention has been developed as a supervisory and protective system for primarily domestic mobile homes and hospital use, the principles embodied therein are of wide applicability and accordingly, the use of a hospital protective circuit in the description hereinafter following will be understood as only for illustrative purposes and not as limiting.

Operating rooms of hospitals are dangerous during the performance of operations due to the fact that pure oxygen is used when the patient is anesthetized which creates a flammatory environment. In some instances, where ether is used, the combination of ether and oxygen also creates a flammatory environment within the room. Thus, it becomes extremely important to prevent the development of sparks by the generation of static electricity in the clothing of the surgical personnel as well as preventing the equipment used in operating rooms from becoming ungrounded. The generation of static electricity is prevented by grounding the personnel through devices secured to the personnel's shoes. Then if, for example, an instrument becomes ungrounded, a leakage of current may occur which will give a person holding and using the instrument a shock due to the fact that the person is already well grounded. The shock may be of such a magnitude as to cause serious injury or even death. While fuses and circuit breakers are capable of protecting an electrical system against extreme overloads, including those due to short circuits, they are not capable for well-understood reasons of protecting persons utilizing equipment as above described from injury in the manner above described.

Similar situations, of course, exist domestically and are well known.

Accordingly, the objects of this invention are:

(1) To provide a supervisory circuit which will give a desired signal upon the appearance of a minute current in a suitable sensing device.

(2) To provide apparatus, as aforesaid, particularly adapted for disconnecting power supply to a circuit upon the connection of an undesired leakage therein to a return circuit.

(3) To provide apparatus, as aforesaid, which will disconnect a power supply to an instrument or appliance powered thereby upon the connection of a leakage therein to a return circuit through the body of a person.

(4) To provide apparatus, as aforesaid, which will be isolated from the normal fuse or circuit-breaker apparatus utilized so as to have no effect on the operation thereof.

(5) To provide apparatus, as aforesaid, whose power requirements will be sufficiently small as to be negligible.

(6) To provide circuitry, as aforesaid, which may be readily adapted to the giving of a variety of desired signals either in addition to or in place of the disconnecting of the power supply as above mentioned.

(7) To provide apparatus, as aforesaid, which can be adapted for the detection of other instances of current leakage, either in addition to or instead of shorting of a potential through the body of a person as above set forth.

(8) To provide apparatus, as aforesaid, which is of extreme simplicity and accordingly may be both provided and maintained in good operating condition at a minimum of cost.

(9) To provide a device, as aforesaid, having a high degree of reliability.

Other objects and purposes of the invention will be apparent to persons acquainted with apparatus of this general type upon reading the following description and inspecting the accompanying drawing.

Summary of the invention

Figure 1:
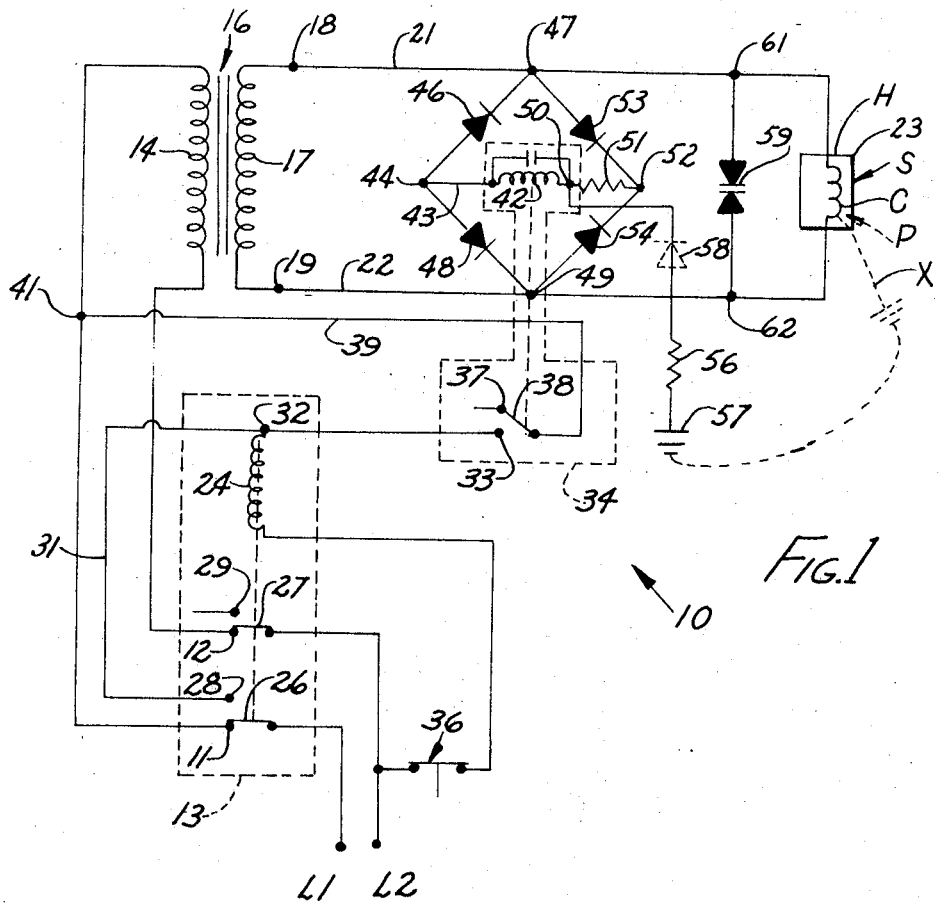
FIG. 1 is a schematic diagram of the circuit embodying the invention.

In general, the objects and purposes of the invention are met by providing a relay circuit capable, upon being energized, of disconnecting normally closed contacts in the power supply of the circuit with which the protective system is being used. To accomplish this, power is first drawn from said circuit for maintaining a suitable threshold energizing means for said relay circuit. Second circuitry is provided between a sensing circuit and a return path by which a potential is supplied to said sensing circuit upon the appearance of a triggering potential by which said apparatus is intended to operate, such as the presence of a person's body connecting an area of electrical leakage, such as a domestic appliance or hospital instrument whose insulation has broken down, with the return path. Such additional potential is applied to the sensing apparatus and functions to complete its energization and the consequent energization of the relay circuit above mentioned and the disconnecting of the power supply. The modified circuitry comprises the placement of rectifiers at each end of the sensing apparatus to properly rectify and direct the flow of current therethrough.

Detailed description

The drawing illustrates an electrical schematic 10 showing a circuit utilizable in a supervisory system.

The terminals L1 and L2 are connected to any suitable source of supply. The terminals are then connected through one pair of contacts 11 and 12 of a relay 13 to a primary winding 14 of a supply transformer 16. The secondary winding 17 of said transformer 16 is connected through a pair of output terminals 18 and 19 and output conductors 21 and 22 connected thereto, respectively, to an electrically operated load indicated generally by the numeral 23. For illustrative purposes, the load may be a surgical instrument S having a coil C therein whose insulation may be assumed for illustrative purposes to have broken down and which thereby has a conductive path P to the housing H.

Returning now to the apparatus of the invention, a relay winding 24 is provided for operating the relay armatures 26 and 27 which connect simultaneously with the contacts 11 and 12 in one position and the contacts 28 and 29 in the other position. The contact 29 is isolated. However, the contact 28 is connected through conductor 31 to a junction point 32 and thence to the contact 33 of a second relay 34, said second relay being a highly sensitive relay. The winding 24 of the relay 13 is connected at its one end to the junction point 32 and at its other end through a normally closed reset switch 36 to the input terminal L2. The other contact 37 of the relay 34 is isolated and the armature 38 thereof is connected by a conductor 39 to a junction point 41 on the one side of said conductors connected to the terminal L1.

The modification of the present circuit over the circuit of, for example, FIG. 1 of the aforementioned patent is set forth in the following discussion. The winding 42 of the sensitive relay 34 is connected at one end by a conductor 43 to a junction point 44. A rectifier 46 has its anode connected to the junction point 44 and its cathode connected to the junction point 47 on the output conductor 21. A rectifier 48 has its anode connected to the junction point 44 and its cathode connected to the junction point 49 on the output conductor 22. The other end of the winding 42 is connected through a junction point 50 and resistance 51 to a junction point 52. A rectifier 53 has its cathode connected to the junction point 52 and its anode connected to the junction point 47. A rectifier 54 has its cathode connected to the junction point 52 and its anode connected to the junction point 49.

The junction point 50 is connected through a protective resistance 56 to any suitable ground return path connection 57. If desired, a rectifier 58 (indicated in dotted lines) can be used to prevent operation of the sensitive relay by minor transients which might appear in the circuit. A surge suppreser is provided by a pair of rectifiers 59 having, in this embodiment, their cathodes connected together and whose anodes are connected to the junction points 61 and 62 located on the conductors 21 and 22, respectively.

It is recognized, of course, that the orientation of the rectifiers 46, 48, 53 and 54 can be reversed without effecting the sensitivity of the circuit. That is, the rectifier 46 could be connected so that its anode is connected to the junction point 47 and its cathode is connected to the junction point 44. The rectifier 48 could be connected so that its anode is connected to the junction point 49 and its cathode is connected to the junction point 44. Furthermore, the rectifiers 53 and 54 could be connected so that their anodes are connected to the junction point 52 and their cathodes are connected to the junction points 47 and 49, respectively. This modification would require the further change of a reversal in the orientation of the optional rectifier 58.

Operation

The operation of the device embodying the invention will be described in detail hereinbelow for a better understanding of the invention.

In its "at rest" condition, namely when there is no conductive path between the housing H of the surgical instrument S contanied in the above-suggested example, and the return path, the armatures 26 and 27 of the power relay 13 will lie against the contacts 11 and 12 and provide normal connection between the source terminals L1 and L2 and the primary winding 14 of the transformer 16 and thereby supply power to the secondary lines 21 and 22. Simultaneously, current will flow in one-half cycle from the junction point 47 on the secondary line 21 through the rectifier 53, thence through the winding 42 of the sensitive relay 34 to the junction point 44 and thence through the rectifier 48 to the junction point 49. During the next following half cycle when the secondary line 22 is positive with respect to the secondary line 21, current will flow through the rectifier 54, thence through the winding 42 to the junction point 44 and thence through the rectifier 46 to the junction point 47. The value of the resistance 51, however, together with the resistance in winding 42 itself, is such that the current flowing through said winding 42 is insufficient to activate the armature 38, although the magnitude of the current flowing through the winding 42 is held as high as possible without actually moving the armature 38.

With the energizing circuit for the winding of the power relay 13 broken at the contacts of the sensing relay 34, for so long as the armature 38 remains against the contact 37, the relay 13 will be de-energized and its armatures 26 and 27 will remain against the contacts 11 and 12.

Assume now that something happens at "X" to connect the housing H to the return path, such as by a person touching the surgical instrument S while in contact with a return path connection, such as being grounded by the devices in the persons shoes while in the operating room. This provides a path from the surgical instrument to the junction point 50 which will cause an additional current to flow through the sensitive relay 42 to move its armature 38 against the contact 33. This makes a connection from one supply line at the junction point 41 to the junction point 32 and thence through the winding 24 of the power relay 13 to a junction point on the supply line L2, thereby energizing said relay 13 and moving the armatures thereof into contact with the contacts 28 and 29. This will break the supply to the primary winding of the transformer 16, thereby de-energizing the entire system and thereby preventing harm to the person by whom the contact was made at "X." Simultaneously, the connecting of the armature 26 with the contact 28 locks in the relay 13 to hold same in its energized condition until proper corrective action can be taken to repair or disconnect the area in which the short circuit is occurring. The normally closed reset switch 36 may then be momentarily opened to de-energize the winding 24 and permit the system to return to its "at rest" condition as above described.

The surge suppresser 59 is provided to absorb the counter E.M.F. developed between the lines 21 and 22 when the transformer 16 is de-energized by the opening of the relay 13.

While it is preferable as shown herein to place the contacts of the power relay 13 on the primary side of the supply transformer where such is convenient and such a transformer is available, it will be recognized that this is solely a matter of convenience. The invention will work equally well if for any reason it is necessary to place the contacts of the power relay 13 on the secondary side of the transformer, although in such case it may be necessary to provide suitable means for the prevention of excessive arcing at such contacts.

Modification

Figure 2:
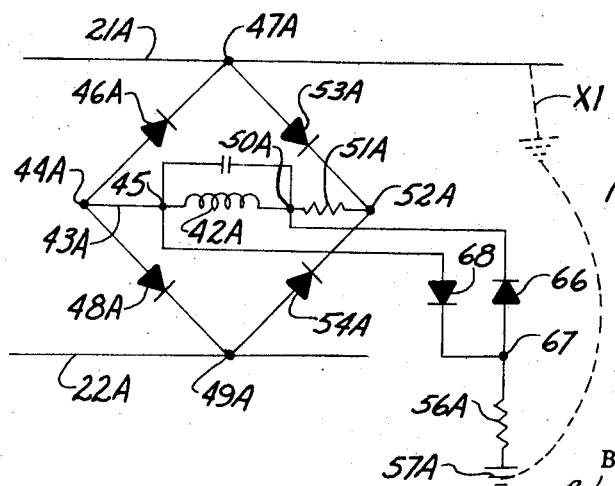
FIG. 2 is a partial schematic diagram of a modification of the circuit illustrated in FIG. 1.

FIG. 2 illustrates a modified embodiment of the circuit illusrtated in FIG. 1. The components of the modified circuit will be referred to by the same reference numerals designating corresponding parts of the circuit 10 but with the suffix "A" added thereto.

The change between the modified circuit and the circuit illustrated in FIG. 1 is the utilization of a rectifier 66 having its anode connected to the end of the protective resistor 56A at junction point 67 and having its cathode connected to the junction point 50A at one end of the winding of the sensitive relay 42A. A second rectifier has its cathode connected to the junction point 67 and its anode connected to the junction point 45 at the other end of the sensitive relay winding 42A.

The operation of the circuit illustrated in FIG. 2 is essentially the same as described with respect to FIG. 1. However, assuming that a short circuit occurs at "X–1" to connect one output line (such as 21A) to the return path, and assuming at that point in time the output line 21A is positive with respect to the output line 22A, a leakage current will flow from the output line 21A through the protective resistance 56A, rectifier 66 and through the sensitive relay 42A thus further energizing same to move its armature 30A against the contact 33. During the next half cycle when the output line 22A is positive with respect to the output line 21A, an additional current will flow from the junction point 49A through the rectifier 54A to the junction point 52A, thence through the resistance 51A, sensitive relay 42A to the junction point 45 where the current will split so that the additional leakage current will flow therefrom through the rectifier 68 to the junction point 67 and thence through the protective resistance 56A to the fault "X–1." Thus, the sensitive relay 42A is further energized during both half cycles and not during just one-half of a cycle as illustrated in the circuitry of FIG. 1. Thus, twice the amount of the leakage current is obtained during one cycle of operation utilizing the modification of FIG. 2. The modification also results in a faster operation of the sensitive relay 42A.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An automatic protective circuit for de-energizing an electric power circuit upon the appearance of a leakage therefrom to a return path, said power circuit including a transformer, the secondary winding of said transformer having two output terminals, comprising:
    a power relay having an energizing winding and having contacts in series with said power circuit for de-energizing said power circuit when said winding of said power relay is energized;
    sensing relay means having an energizing winding and having contact means in series with said power relay winding whereby said power relay can be energized in response to energization of said sensing relay means;
    first rectifier means connected to one end of said sensing relay means;
    second rectifier means connected to the other end of said sensing relay means;
    means connecting at least one of said ends of said sensing relay means to ground; and
    resistive means connected in series with said sensing relay means between said first and second rectifier means for regulating the magnitude of the current flow through said sensing relay means to a level just below the level which is sufficient to energize said sensing relay means, the appearance of a leakage through said return path effecting an increased flow of current through said sensing relay means to raise the level of current to a magnitude sufficient to energize said sensing relay means to de-energize said power circuit, said resistive means further effecting a flow of current through said sensing relay means and said return path rather than through one of said rectifier means to thereby assure the increased flow of current through said sensing relay means when said leakage occurs to said return path.

2. An automatic circuit according to claim 1, wherein said first and second rectifier means includes first and second pairs of rectifiers, respectively, said first pair having one of their ends connected to one end of said sensing relay means and their other ends connected, respectively, to said output terminals, said second pair having one of their ends connected to the other end of said sensing relay means and their other ends connected, respectively, to said output terminals.

3. An automatic circuit according to claim 2, wherein said first pair of rectifiers have anodes which are connected to said one end of said sensing relay means and whose cathodes are connected, respectively, to said output terminals; and
    wherein said second pair of rectifiers have cathodes which are connected to said other end of said sensing relay means and whose anodes are connected, respectively, to said output terminals.

4. An automatic circuit according to claim 2, wherein said first pair of rectifiers have cathodes which are connected to said one end of said sensing relay winding and whose anodes are connected, respectively, to said output terminals; and
    said second pair of rectifiers have anodes which are connected to said other end of said sensing relay winding and whose cathodes are connected, respectively, to said output terminals.

5. An automatic circuit according to claim 1, wherein said means connecting at least one of said ends of said sensing relay means to ground comprises a resistance.

6. An automatic circuit according to claim 1, wherein said means connecting at least one of said ends of said sensing relay means to ground comprises a series connected resistance and rectifier.

7. An automatic circuit according to claim 6, wherein the cathode of said rectifier is connected to said other end of said sensing relay means and the anode thereof is connected to one end of said resistance.

8. An automatic protective circuit for de-energizing an electric power circuit upon the appearance of a leakage therefrom to a return path, said power circuit including a transformer, the secondary winding of said transformer having two output terminals, comprising:
    a power relay having an energizing winding and having contacts in series with said power circuit for de-energizing said power circuit when said winding of said power relay is energized;
    sensing relay means having an energizing winding and having contact means in series with said power relay winding whereby said power relay can be energized in response to energization of said sensing relay means;
    first rectifier means connected to one end of said sensing relay means;
    second rectifier means connected to the other end of said sensing relay means; and
    a first rectifier having its cathode connected to one end of said sensing relay means and a second rectifier having its anode connected to the other end of said sensing relay means and its cathode connected to the anode of said first rectifier, said anode of said first rectifier and cathode of said second rectifier being connected through a resistance to ground;

9. An automatic circuit according to claim 8, including resistive means connected in series with said sensing relay means between said first and second rectifier means and between at least one of said first and second rectifier means and the connection of the respective one of said first and second rectifiers to said sensing relay means.

References Cited

UNITED STATES PATENTS

| | | | |
|---|---|---|---|
| 3,168,682 | 2/1965 | Moore et al. | 317—18 |
| 3,242,382 | 3/1966 | Rogers | 317—18 |

OTHER REFERENCES

Archer E. Knowlton, Standard Handbook for Electrical Engineers, 1949, Eighth edition, McGraw-Hill Book Co., p. 855.

JAMES D. TRAMMELL, Primary Examiner

U.S. Cl. X.R.

317—52